United States Patent [19]

Hildebolt

[11] 3,916,029

[45] Oct. 28, 1975

[54] CENTERFILLED PET FOOD COMPOSITION

[75] Inventor: William M. Hildebolt, Mickleton, N.J.

[73] Assignee: Campbell Soup Company, Camden, N.J.

[22] Filed: Aug. 4, 1972

[21] Appl. No.: 277,851

[52] U.S. Cl. .................. 426/94; 426/283; 426/556; 426/805; 426/138
[51] Int. Cl.² .......................................... A23K 1/10
[58] Field of Search ............... 99/2 R, 7, 86, 87, 88, 99/108, 150; 426/138, 152, 283, 94, 556, 635, 623, 630, 654, 805

[56] References Cited
UNITED STATES PATENTS

| | | | |
|---|---|---|---|
| 3,131,066 | 4/1964 | Mitzelfelt | 99/108 |
| 3,532,510 | 10/1970 | Zimmerman | 99/86 |
| 3,551,161 | 12/1970 | Whitestone | 99/87 |
| 3,656,967 | 4/1972 | Barton | 99/86 |
| 3,694,233 | 9/1972 | Kaplow et al. | 99/150 R |
| 3,732,112 | 5/1973 | Frankenfeld et al. | 99/150 R |
| 3,736,148 | 5/1973 | Katz | 99/150 R |

*Primary Examiner*—Norman Yudkoff
*Assistant Examiner*—Curtis P. Ribando
*Attorney, Agent, or Firm*—Donald C. Simpson

[57] ABSTRACT

A biologically stable animal food composition comprising a deformable, shape-retaining proteinaceous inner matrix and an outer pastry shell.

4 Claims, No Drawings

CENTERFILLED PET FOOD COMPOSITION

The present invention relates to new and useful improvements in the composition of animal food and particularly in the composition of a semi-moist animal food having a high nutritional value and capable of being stored without refrigeration for a substantial period of time in non-hermetic containers.

The two conventional forms of animal foods are the meal type animal food or dry animal food having a moisture content normally below 10% and the canned type animal food or moist animal food having a moisture content of about 75%. Recently semi-moist animal foods have been introduced having a moisture content in the 15 to 40% range which are capable of being stored without refrigeration in non-hermetic containers. These prior semi-moist animal foods, for example, are the animal foods of the Canadian Pat. No. 560,470, dated July 15, 1958, or of the U.S. Pat. No. 3,202,514, dated Aug. 24, 1965. In these prior semi-moist animal foods there is reliance upon an extremely low pH (in the range of 2.0 to 5.0) or an extremely high water soluble sugar content (in the range of 20 to 45% or more) to prevent bacteriological growth.

As was noted in U.S. Pat. No. 3,202,514, the flavor of low pH products is unpopular with canine animals. Foods with high sugar contents are well known to be nutritionally disadvantageous for dogs or like animals.

It is an object of the present invention to provide a semi-moist animal food which is microbiologically stable when stored without refrigeration in non-hermetic packages and which does not rely on either a low pH or a high sugar content to prevent bacteriological growth.

A further object of the present invention is to provide a novel semi-moist animal food with the features set forth above having a high nutritional and caloric value providing all the constituents of a balanced diet for the animal and having a high degree of palatability to the animal.

Another object of the present invention is to provide a semi-moist animal food in a novel shape and form which is appealing to the eye and easy to handle and measure proper amounts for feeding to an animal.

Still a further object of the present invention is to provide a novel semi-moist animal food having an inner matrix including proteinaceous meat and vegetable protein in a semi-moist freely moldable form which is microbiologically stable surrounded at least partially by a pastry shell in a relatively dry form and in which migration of moisture from the inner matrix to the outer shell is minimized.

A further object of the present invention is to provide a novel semi-moist animal food of the above-described type where microbiological stability in the inner matrix is aided by an amount of salt normally in excess of that which would appeal to the palate of an animal but wherein the overall salt content of the animal food product is well within the range an animal would readily accept.

In accordance with the present invention, a semi-moist animal food of good palatability and nutrition value and capable of being stored for a long period of time in a non-hermetic package without refrigeration is provided in the form of an inner, proteinaceous matrix surrounded by a pastry shell. There is a critical relationship between the composition of the inner matrix and the composition of the shell which provides the product with microbiological stability even though the inner matrix is formulated from normally biological growth-supporting constituents with sufficient moisture to support biological growth.

The critical elements of the present invention are water content, water activity, and relative water activity. Quantitatively, water activity ($A_w$) is equal to the vapor pressure of a product divided by the vapor pressure of pure water under the same conditions. It is water activity, and not total water content that is indicative of the water available in a system which will support biological and chemical reactions. Relative water activity for the purpose of this invention is defined as the ratio of the water activity of the matrix to the water activity of the shell.

A water of activity of 0.84 or lower will effectively prevent the growth of spoilage producing organisms in the shell and matrix. The principle exceptions are mold and the organisms which flourish under extreme environmental conditions. Accordingly, for the purposes of the present invention, the respective water activities of the pastry shell and the proteinaceous matrix are maintained below 0.85; potassium sorbate, propylene glycol, etc., are used as required to provide antimycotic activity. Preferably, the water activity of the inner matrix is about 0.83.

The relative water activity should be in the range of about 0.95 up to about 1.2. Preferably, however, it is kept as near unity as reasonably possible. Where there is a difference between the water activity of the shell and the water activity of the matrix, there is a tendency for water to migrate from the region of higher water activity to a region of lower water activity until the water activities equalize. The inner matrix of the product of this invention can be thought of as a "sink" or as a buffered system to which small amounts of water may migrate from the shell without seriously changing the essential character of the matrix. However, because of the low total water content of the outer pastry shell as compared to the higher total water content of the inner matrix, migration of water from the matrix to the shell could greatly change the character of the pastry shell. Accordingly, the relative water activity is an important factor in the success of the present invention.

The inner matrix is in semi-moist form. By semi-moist as used herein is meant a product having a mositure content of between approximately 15 to 40% by weight in its final form and preferably in the range of approximately 20 to 30% by weight, and which is readily moldable but will retain its molded shape. The materials chosen for the inner matrix as a constituent of the complete animal food which provides a balanced diet for an animal will preferably include proteinaceous meat, vegetable protein, fat, sugar, salt and other additives. Water will be added to these ingredients so that after the inner matrix is processed and cooked or pasteurized, it is within the definition of semi-moist.

The proteinaceous, flavoring, nutritional and coloring ingredients which comprise the inner matrix are those generally found in semi-moist animal foods as described in the prior art. Except for the presence of the water activity-controlling components, the inner matrix would normally be capable of supporting bacteriological growth. However, in accordance with the present invention, the water activity of the inner matrix is maintained at the desired level by adding to the inner matrix low molecular weight water soluble solids including sugar and salt in amounts such that the total water soluble sugar content including added sugar and sugar present in the product constituents is less than 15%, preferably about 10% or less, and the total water soluble salt content including added salt and salt present in the product constituents is approximately 3 to 4%. These above quantities of low molecular weight water soluble solids have been found to be adequate to maintain the water activity of the inner matrix at or below approximately 0.85 when the total moisture content of the inner matrix is approximately 25% by weight.

As set forth previously, the inner matrix is at least partially enclosed by an outer pastry shell which, when baked, is relatively dry to provide a product which is easily handled. The outer pastry shell generally consists of a mixture of flour, shortening, sugar, flavor enhancers, preservatives and water. The water added to the dry mix of the pastry shell is generally in the range of 20 to 30% by weight to provide the mix with adequate consistency to permit formation of the pastry shell about the inner matrix. The amount of sugar added to the pastry shell and the total moisture of the baked pastry shell are balanced and controlled to insure a water activity of below 0.85. In general the total moisture of the baked pastry shell must be below 20% and preferably below 15% by weight. A range of about 12–14% is the most preferred range. It is this low total water content of the pastry shell that permits the use of only small amounts of sugar to provide the requisite water activity. Thus, salt can be avoided completely as can undesirable high sugar contents. Accordingly, the high salt content of the inner matrix is balanced by the effectively salt-free pastry shell to provide a product having an overall salt content well within the limits of palatability.

The final product will generally contain approximately equal amounts by weight of the inner matrix and outer pastry shell. In this final product the salt content of the inner matrix will be at least about 3% although preferably not greater than about 4% which normally is a high amount for the desired palatability to animals but the total salt content of the entire product should be kept in the range of about 1 ½ to less than 3%, preferably not greater than about 2% which will equal the desired total salt content in an animal food product. The overall product will have a high nutritional value, will be readily acceptable by animals and is capable of being stored without refrigeration for substantial periods of time in non-hermetic containers.

In formulating the product of the invention, Raoult's Law can be advantageously utilized to estimate water vapor pressure for various salt and/or sugar additions in calculating the water activity of the shell and matrix. It should be emphasized, however, that this is merely for estimation; the measured vapor pressures should be used in the final calculation of water activity of the baked product. The vapor pressures are measured after separating and isolating the pastry shell from the inner matrix.

A typical example of the present migration comprises an inner matrix and an outer matrix in substantial equal weight proportions. A typical inner matrix comprises, by weight, 26.0% beef, 25.0% soybean meal, 10.0% dextrose, 7.0% bone meal, 5.4% meat meal, 4.5% chicken, 4.0% whole eggs, 4.0% propylene glycol, 2.2% salt (essentially sodium chloride), 2.0% yeast hydrolysate, 2.0% corn gluten meal, 0.3% potassium sorbate, 4.1% flavor, minerals, vitamins, color, etc., and 3.5% water.

A typical outer pastry shell comprises 84.5% cereal flours, 8.7% shortening, .3% dextrose, 0.9% propylene glycol, 0.6% yeast hydrolysate, 0.3% potassium sorbate and 2.0% flavor, minerals, vitamins, etc. Water is added to the dry mix to bring the water content to 20–30%. The ingredients of the inner matrix are blended and cooked for a sufficient length of time to pasteurize the mixture. For example, the matrix ingredients are blended together and cooked at a temperature of 200°F. for approximately 20 minutes. Thereafter, the cooked ingredients of the inner matrix are ground and placed into an extruder of the type which will extrude the ingredients of the inner matrix in the form of a continuous cylinder and simultaneously extrude the outer pastry shell around the inner matrix thus providing a continuous length of product including the inner matrix in cylindrical form surrounded by an outer pastry shell of substantially uniform thickness. This extruded product is cut into segments of generally uniform length with the individual segments thereafter being placed in an oven for a sufficient length of time to bake the outer pastry shell. Typically, the product is maintained in an oven at a temperature of approximately 400°F., for approximately 15 minutes. During the final baking operation, the moisture content of the inner matrix is reduced to approximately 20–25% while the water content of the outer pastry shell is reduced to about 13.5%. The Aw of the inner matrix after baking is about 0.83; the Aw of the shell is about 0.82.

It will be recognized, therefore, that the present invention represents a critical combination of a pastry shell of low water content such that it can be microbiologically stabilized with only a small sugar addition, and an inner matrix stabilized, inter alia, with salt in proportions exceeding that normally considered palatable. The product, because of the manner of combination, is both palatable and stabilized without undesirable quantities of sugar and salt or without the objectionable pH control.

While a particular embodiment of the present invention has been described herein, it is not intended to limit the invention to such a disclosure and various changes and modifications may be incorporated therein within the scope of the following claims.

I claim:

1. An animal food composition adapted to be packaged in non-hermetic packaging material without sterilization and stored for long periods without refrigeration consisting essentially of a pasteurized deformable and shape-retaining semi-moist inner matrix and an in situ-baked outer pastry shell at least partially enclosing the inner matrix, said inner matrix comprising edible proteinaceous material derived from meat and vegetable sources, from about 15 to 40% by weight total water, less than 15% by weight total water-soluble sugar, and at least 3% up to about 4% by weight total water-soluble salt, said inner matrix further characterized by a water activity of less than 0.85, said pastry shell comprising flour, shortening, less than 20% by weight total water and sufficient sugar to provide a water activity to the baked shell of less than 0.85, the relative water activity of the product falling in the range of 0.95 to 1.20, the relative proportions of inner matrix and outer shell corresponding to an overall total water-soluble salt content in the range of 1½% to less than 3% by weight.

2. A composition in accordance with claim 1 in which the inner matrix has a total water content of about 20 to 30% by weight and a maximum total water-soluble sugar content of about 10% by weight.

3. A composition in accordance with claim 2 in which the pastry shell has a total water content less than 15% by weight.

4. A composition in accordance with claim 3 wherein the relative water activity is about 1 and wherein the inner matrix and pastry shell are present in about equal proportions.

* * * * *